(12) United States Patent
Chang et al.

(10) Patent No.: US 6,775,733 B2
(45) Date of Patent: Aug. 10, 2004

(54) INTERFACE FOR USB HOST CONTROLLER AND ROOT HUB

(75) Inventors: Liang-Hsi Chang, Hsinchu (TW); Iun-Bohr Rong, Hsinchu Hsien (TW); Ping-Ying Chu, Tainan Hsien (TW); Chao-Ting Kao, Taipei Hsien (TW)

(73) Assignee: Winbond Electronics Corp. (TW)

(*) Notice: Subject to any disclaimer, the term of this patent is extended or adjusted under 35 U.S.C. 154(b) by 498 days.

(21) Appl. No.: 09/873,617

(22) Filed: Jun. 4, 2001

(65) Prior Publication Data
US 2002/0184429 A1 Dec. 5, 2002

(51) Int. Cl.$^7$ .............................................. G06F 13/20
(52) U.S. Cl. ...................................... 710/313; 710/311
(58) Field of Search ................................ 710/314, 305, 710/306, 310, 311, 313

(56) References Cited

U.S. PATENT DOCUMENTS

| | | | | |
|---|---|---|---|---|
| 5,890,015 A | * | 3/1999 | Garney et al. | 710/62 |
| 6,205,501 B1 | * | 3/2001 | Brief et al. | 710/100 |
| 6,535,947 B1 | * | 3/2003 | Amoni et al. | 710/305 |
| 6,542,946 B1 | * | 4/2003 | Wooten | 710/106 |
| 6,567,875 B1 | * | 5/2003 | Williams et al. | 710/302 |
| 6,587,053 B1 | * | 7/2003 | Lee | 340/825.72 |
| 2002/0116565 A1 | * | 8/2002 | Wang et al. | 710/313 |

* cited by examiner

Primary Examiner—Glenn A. Auve
(74) Attorney, Agent, or Firm—Raymond Sun

(57) ABSTRACT

A USB host system includes a core logic having a host controller and a first root hub coupled thereto, a second root hub external to the core logic and coupled to the first root hub via a mapping interface, and a plurality of USB ports coupled to the second root hub, each of the USB ports adapted to couple an external USB device.

15 Claims, 3 Drawing Sheets

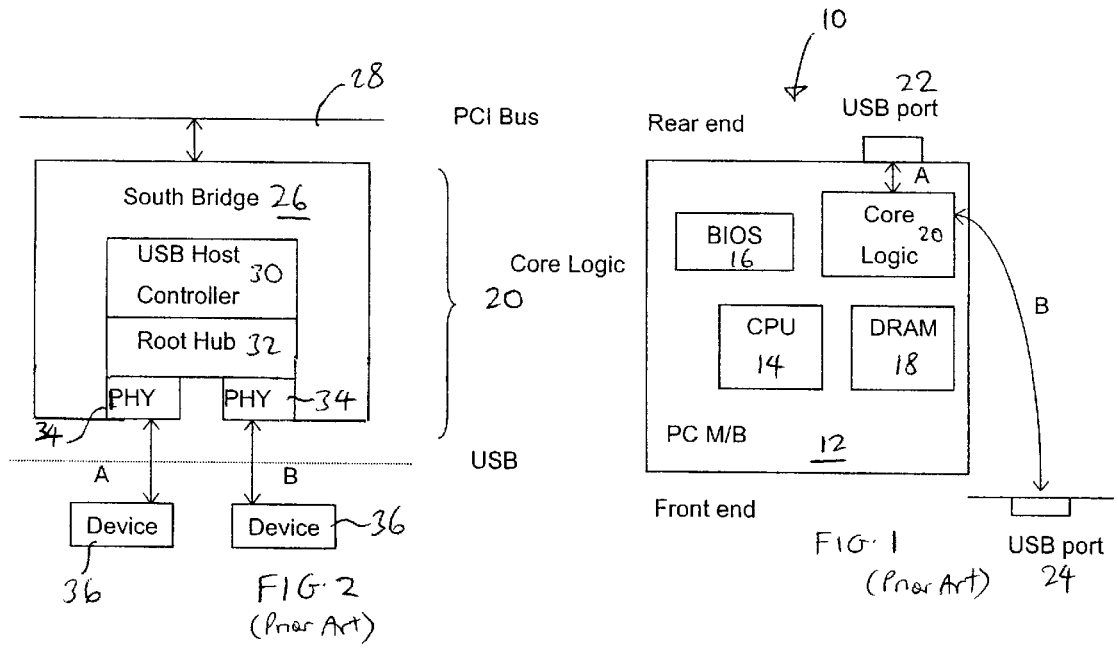
FIG. 1 (Prior Art)
FIG. 2 (Prior Art)
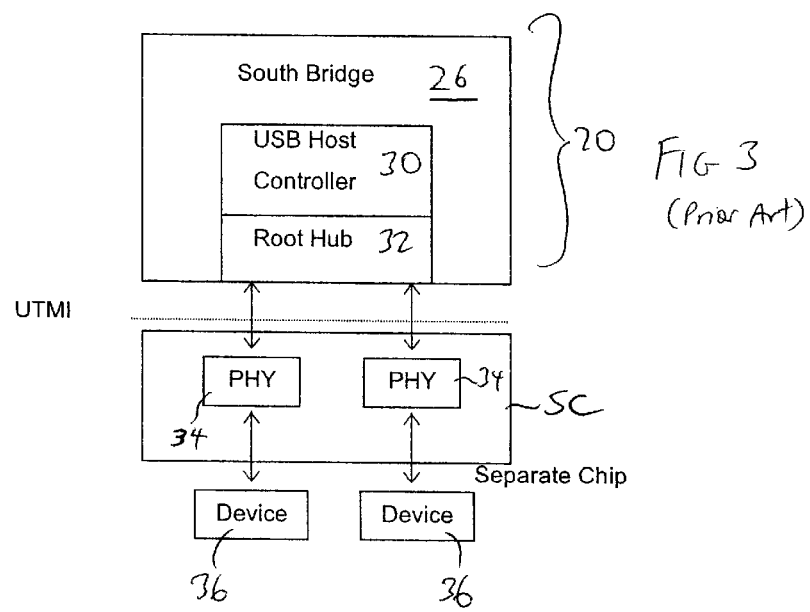
FIG. 3 (Prior Art)

INTERFACE FOR USB HOST CONTROLLER AND ROOT HUB

BACKGROUND OF THE INVENTION

1. Field of the Invention

The present invention relates generally to an interface that is used for Universal Serial Bus (USB) communications, and more particularly, to a universal media interface for use between a USB host controller and a root hub.

2. Background Art

USB is commonly used to interface data communications or connections between a personal computer (PC) and peripheral devices (such as printers and scanners, among others). FIGS. 1 and 2 are schematic diagrams illustrating the typical USB connection between a host system and one or more peripheral devices.

Referring first to FIG. 1, the host system 10 (if embodied in the form of a PC) would typically include a motherboard 12. A CPU 14, a BIOS 16, a memory 18 (such as a DRAM), and a core logic 20 can all be provided on the motherboard 12 in manners that are well-known in the art. At least a first port 22 can be positioned adjacent a rear end panel of the host system 10 and at least a second port 24 can be positioned adjacent a front end panel of the host system 10.

FIG. 2 illustrates the interface of the core logic 20 with the peripheral devices. Specifically, the core logic 20 has a south bridge 26 that is coupled to a PCI bus 28 for communicating data inside the host system 10. The south bridge 26 includes a USB host controller 30, and a root hub 32 communicating with the controller 30 and one or more analog physical layers (PHY) 34. As is well-known in the art, a physical layer is the lowest (signal) level of communication technology. The PHYs 34 provide low level analog differential signals to USB devices 36 (such as peripherals) via lines A and B. The data transfer rate can vary depending on the applicable USB standard. For example, for USB 2.0, the data transfer rate is 480 MHz (high speed), and for USB 1.1, the data transfer rate is 12 MHz (full speed) or 1.5 MHz (low speed).

Unfortunately, when the circuits illustrated in FIGS. 1 and 2 are used for USB 2.0, the high speed data transfer rate of 480 MHz may result in certain undesirable problems. First, the yield on the PHYs 34 may be lowered, thereby lowering the yields on the south bridge 26 which will increase the costs of production. The low yield may be attributable to the low limitation to process parameter deviation, and low immunity to the coupling noise of the high speed analog circuit. Second, the signal integrity on the USB port(s) 24 adjacent the front end panel will be compromised. As shown in FIG. 1, the south bridge 26 of the core logic 20 is typically closer to the rear end of the motherboard 12 so that the line A from port 22 is short. However, the length of the line B from port 24 is usually much longer. As a result, the long line will distort the high speed analog signals that are being transmitted along line B, thereby damaging the integrity of the signal (i.e., the signals may not be consistent). Third, the high clock rate along line B (i.e., 480 MHz) may cause high electromagnetic interference (EMI) at the motherboard 12 because high speed USB signals traveling along the long line B will emit electromagnetic waves through the line B, which causes high EMI. This high EMI will increase the costs of achieving electromagnetic compatibility.

To overcome the above-mentioned problems, it has been suggested to separate the PHYs 34 from the south bridge 26, and to provide the PHYs 34 in the form of a separate chip SC, as illustrated in FIG. 3. Unfortunately, such an approach raises other difficult problems. For example, such an approach will require an interface between the PHYs 34 and the root hub 32. This interface may require an excessive number of pins at the south bridge 26. For example, if you have six ports, and each port uses 15 pins (under the currently known Intel UTMI standard), this will result in a total of 90 pins. This excessive number of pins will significantly increase the cost of the core logic 20.

Thus, there still remains a need for an interface for use between a USB host system and a peripheral device which overcomes the above-mentioned problems.

SUMMARY OF THE INVENTION

It is an object of the present invention to provide a USB interface between a host system and a peripheral device which does not compromise the integrity of the transmitted signals.

It is another object of the present invention to provide a high speed USB interface between a host system and a peripheral device which does not have a negative impact on the yield of the core logic.

It is yet another object of the present invention to provide a high speed USB interface between a host system and a peripheral device which minimizes EMI.

It is yet another object of the present invention to provide a high speed USB interface between a host system and a peripheral device which not require an excessive number of pins.

To accomplish the objectives of the present invention, there is provided a USB host system that includes a core logic having a host controller and a first root hub coupled thereto, a second root hub external to the core logic and coupled to the first root hub via a mapping interface, and a plurality of USB ports coupled to the second root hub, each of the USB ports adapted to couple an external USB device.

BRIEF DESCRIPTION OF THE DRAWINGS

The invention can be more fully understood by reading the subsequent detailed description of the preferred embodiments, with reference made to the accompanying drawings.

FIG. 1 is a schematic block diagram of a conventional USB host system.

FIG. 2 is a schematic block diagram illustrating the connection of a core logic of the conventional USB host system of FIG. 1 with one or more peripheral devices.

FIG. 3 is a schematic block diagram illustrating the connection of a core logic of another conventional USB host system with one or more peripheral devices.

DETAILED DESCRIPTION OF THE INVENTION

In the following description, for purposes of explanation and not limitation, specific details are set forth in order to provide an understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

Figure 4:
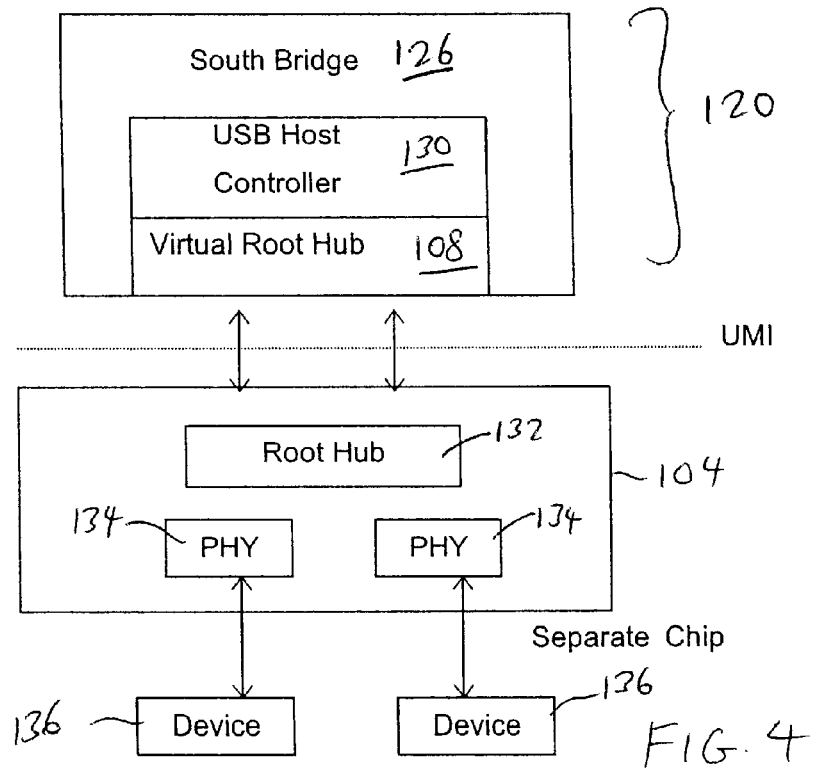
FIG. 4 is a schematic block diagram illustrating a connection according to the present invention of a core logic of a USB host system with one or more peripheral devices.

The present invention provides a USB host system 100 in which the root hub 132 and the PHYs 134 are provided separately (e.g., in a separate chip) from the core logic 120. Referring to FIG. 4, and comparing with FIG. 3, the present invention removes the root hub 132 from the south bridge 126, and provides the root hub 132 and the PHYs 134 in a separate chip 104 (also known as the external root hub with PHYs, abbreviated by ERHP). In addition, a virtual root hub 108 is bundled with the host controller 130 in the same manner as a conventional root hub would be bundled with the host controller. In this regard, it is well-known that conventional host controllers utilize some of the registers of a root hub. In other words, the interface between a conventional host controller and a conventional root hub includes a series of registers through which the host controller controls the root hub. Therefore, a virtual root hub 108 is bundled to the host controller 130 to facilitate such an interface. According to one embodiment of the present invention, the root hub 132 can be identical in structure to the virtual root hub 108, which can both be comprised of a series of hub and port registers. The root hub 132 can also be referred to as an external root hub or a shadowed root hub.

Figure 5:
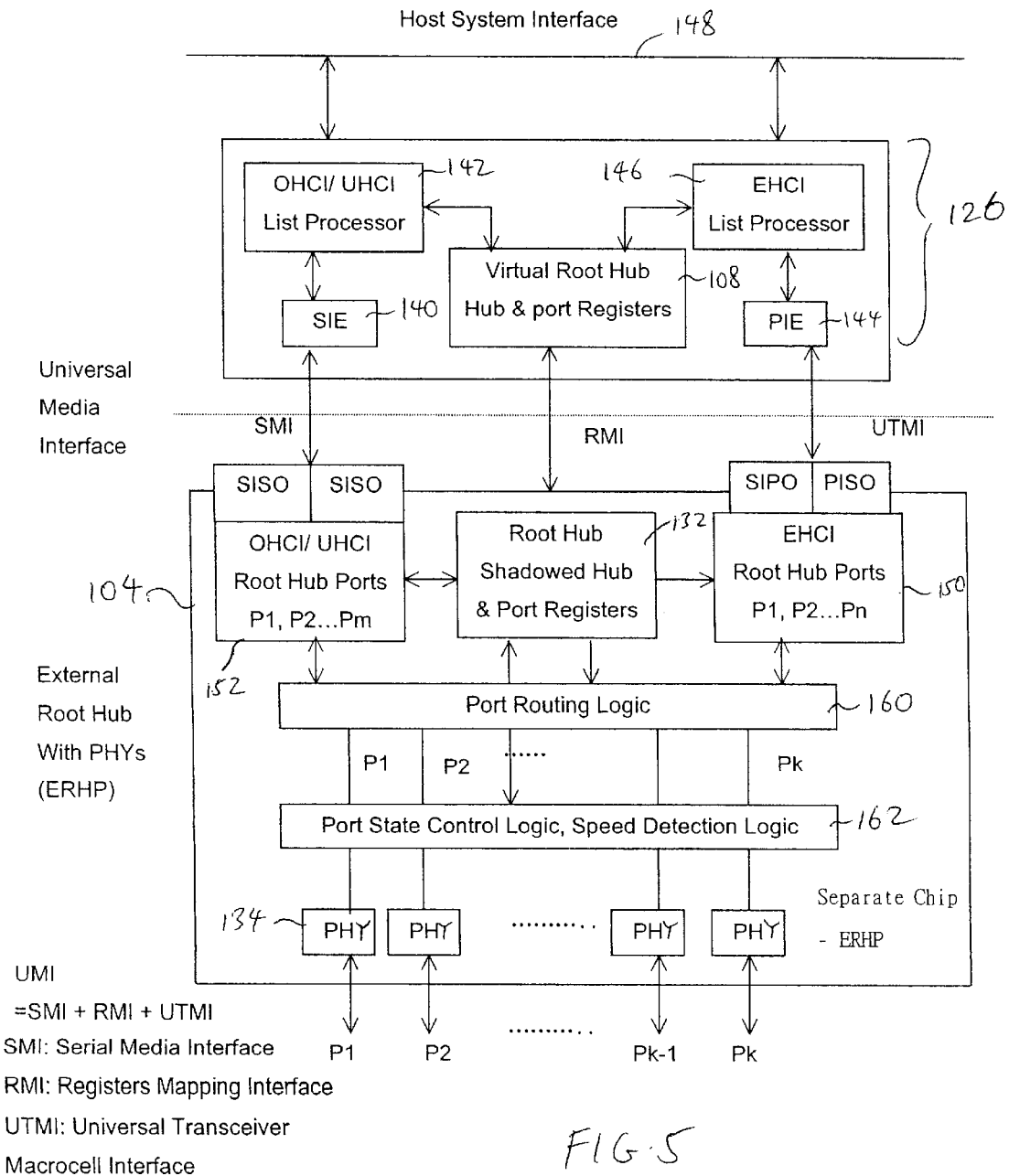
FIG. 5 is a schematic block diagram illustrating in greater detail the connection of FIG. 4.

Referring now to FIG. 5, the south bridge 126 can include the virtual root hub 108 which is coupled to the host controller 130. Here, the host controller 130 can contain one or both of two different sets of interface engines and processors. A first set includes one or more serial interface engines (SIE) 140, and an OHCI/UHCI list processor 142 that is coupled to the virtual root hub 108 and the SIE 140 for operation in connection with USB 1.1. A second set includes a parallel interface engine (PIE) 144, and an EHCI list processor 146 that is coupled to the virtual root hub 108 and the PIE 144 for operation in connection with USB 2.0. As used herein, OHCI means open host controller interface, UHCI means universal host controller interface, and EHCI means enhanced host controller interface. The south bridge 126 is coupled to a host system interface 148 on one side, and is coupled on the other side to the ERHP 104 via a universal media interface (UMI).

The UMI can include three interfaces. A first interface is a register mapping interface (RMI) that interfaces the virtual root hub 108 and the external root hub 132 by mapping the registers in the respective root hubs 108, 132 so that the registers are essentially shadowed by each other. This "shadowing" effect allows the host controller 130 to control the external root hub 132 in the same manner as if the external root hub 132 were positioned inside the south bridge 126 and directly bundled to the host controller 130. In other words, the host controller 130 provides for "transparent" control of the external root hub 132. Any control interface which accomplishes these functions can be used for the RMI interface, and one non-limiting example is the Inter-IC (I2C) Bus interface or other similar interface. As a result, the host system 100 and its south bridge 126 can then issue commands to the processors 142, 146 to read the contents of the registers of the virtual root hub 108, and to have the external root hub 132 perform the functions of a conventional root hub. Examples of such functions include port connection/disconnection detection, port enable/disable control, port reset control, port suspend/resume control, port power on/off control, port over-current detection, the monitoring of statuses, and the control of states.

A second interface is a universal transceiver macrocell interface (UTMI) that interfaces the PIE 144 with SIPO (serial in parallel out) and PISO (parallel in serial out) ports of the EHCI root hub ports 150 of the ERHP 104. A third interface is a serial media interface (SMI) that interfaces the one or more SIE 140 with SISO (serial in serial out) ports of a corresponding number (i.e., one or more) of OHCI/UHCI root hub ports 152 of the ERHP 104. The UTMI and SMI interfaces can be accomplished using any known or conventional UTMI and SMI interfaces that can be used to transfer data.

The ERHP 104 includes the external root hub 132 that is coupled to the EHCI root hub ports 150 and the OHCI/UHCI root hub ports 152. The external root hub 132 and the ports 150, 152 are in turn coupled to a port routing logic 160 that functions to determine whether data (communications) should be routed from the SMI (USB 1.1) or UTMI (USB 2.0) interfaces. The specification for the port routing logic is defined in EHCI. A port state control and speed detection logic 162 is coupled to the port routing logic 160, and performs several functions. For example, the logic 162 is polled by the host controller 130 to determine which PHY ports 134 are plugged in, to control data flow, to control the state of the PHY ports 134, and to detect the speed (i.e., is it USB 1.1 or USB 2.0). The logic 162 is in turn coupled to the plurality of PHY 134, which are in turn coupled to their respective devices 136. The logic 162 can be provided from circuits well-known to those in the USB art, so further details will not be provided. The operation of speed detection (also known as high speed detection handshake) of the logic 162 is both defined in UTMI and USB 2.0 specification. The logic 162 controls the port state according to the results of the speed detection. The port state is defined in USB 2.0 specification.

Figure 6:
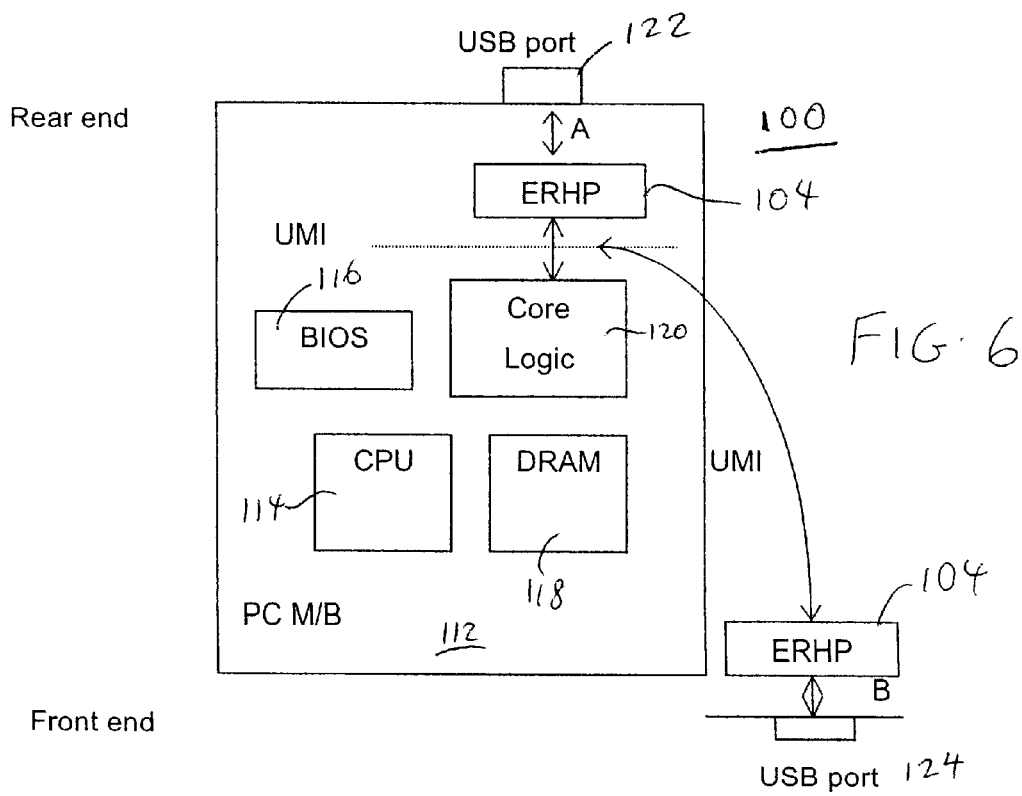
FIG. 6 is a schematic block diagram of a USB host system according to the present invention utilizing the connection of FIGS. 4 and 5.

FIG. 6 illustrates the principles of the present invention embodied in a host system 100. The elements 112, 114,116, 118, 122 and 124 in FIG. 6 can be the same as the elements 12, 14, 16, 18, 22 and 24, respectively, in FIG. 1. The difference in the present invention is that an ERHP 104 is now coupled between each port (such as 122, 124) and the core logic 120 via the UMI interface. Since each ERHP 104 can be positioned adjacent to its respective port 122, 124, the length or distance of the lines A and B will be short, so that the previous problems of low yield, EMI, and poor signal integrity can all be avoided. In addition, the modifications made to achieve the present invention are minimal and do not incur significant additional cost or lead to other problems. For example, the same software commands and drivers that are utilized by the host controller 30 in FIGS. 1–3 can also be utilized by the host controller 130 in FIGS. 4–6 to control the external root hubs 132.

Additional benefits of the present invention also become apparent. First, the problem of providing an excessive number of pins is eliminated since each UMI interface only requires about, for example, 36 pins, and it is no longer necessary to provide 15 pins for each port. Second, since the PHYs 134 are provided separately from the core logic 120, any negative impact on the yields of the PHYs 134 will not affect the yields of the core logic 120.

Since the data transfer rate across the UMI is 60 MHz, it is possible for a plurality of ERHPs 104 to simultaneously interface via the UMI.

In addition, even though FIG. 6 illustrates the provision of one port 124 and 122 at each of the front end panel and the rear end panel, respectively, it is possible to provide any number of ports at each of the front end panel and the rear end panel. As a non-limiting example, three ports can be provided at each of the front end panel and the rear end panel.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A USB host system, comprising:
   a core logic having a host controller and a first root hub coupled thereto;
   a second root hub external to the core logic and coupled to the first root hub via a mapping interface; and
   a plurality of USB ports coupled to the second root hub, each of the USB ports adapted to couple an external USB device;
   wherein the first and second root hubs have identical structures, and each comprises a plurality of registers that are mapped to corresponding registers in the other root hub.

2. The system of claim 1, further including a plurality of physical layers, each physical layer coupled between the second root hub and a corresponding USB port.

3. The system of claim 1, wherein the second root hub is provided in a separate chip from the core logic.

4. The system of claim 3, wherein the separate chip further houses a plurality of physical layers, each physical layer coupled between the second root hub and a corresponding USB port.

5. The system of claim 4, wherein the separate chip further houses a port routing logic coupled between the second root hub and the physical layers.

6. The system of claim 5, wherein the separate chip further houses a port state control and speed detection logic coupled between the port routing logic and the physical layers.

7. The system of claim 3, wherein the separate chip is positioned adjacent a corresponding USB port.

8. The system of claim 1, further including a motherboard, and wherein the core logic is provided on the motherboard, and the second root hub is external of the motherboard.

9. A USB host system, comprising:
   a core logic having a host controller and a first root hub coupled thereto;
   a second root hub external to the core logic and coupled to the first root hub via a mapping interface; and
   a plurality of USB ports coupled to the second root hub, each of the USB ports adapted to couple an external USB device;
   wherein the host controller includes an OHCI/UHCI list processor and an EHCI list processor.

10. A USB host system, comprising:
    a core logic having a host controller and a first root hub coupled thereto;
    a second root hub external to the core logic and coupled to the first root hub via a mapping interface; and
    a plurality of USB ports coupled to the second root hub, each of the USB ports adapted to couple an external USB device;
    wherein the second root hub is provided in a separate chip from the core logic; and
    wherein the core logic interfaces with the separate chip via a universal media interface.

11. The system of claim 10, wherein the universal media interface includes the mapping interface, a serial media interface, and a universal transceiver macrocell interface.

12. A USB host system, comprising:
    a core logic having a host controller and a first root hub coupled thereto;
    a second root hub external to the core logic and coupled to the first root hub via a mapping interface; and
    a plurality of USB ports coupled to the second root hub, each of the USB ports adapted to couple an external USB device;
    wherein the host controller includes a parallel interface engine and a serial interface engine.

13. A USB host system, comprising:
    a first chip having a core logic that includes a host controller and a first root hub coupled thereto;
    a second chip having a second root hub that is coupled to the first root hub via a mapping interface; and
    a plurality of USB ports coupled to the second root hub, each of the USB ports adapted to couple an external USB device;
    wherein the first and second root hubs have identical structures, and each comprises a plurality of registers that are mapped to corresponding registers in the other root hub.

14. The system of claim 13, further including a plurality of physical layers, each physical layer coupled between the second root hub and a corresponding USB port.

15. The system of claim 13, wherein the second chip is positioned adjacent a corresponding USB port.

* * * * *